Patented Nov. 12, 1946

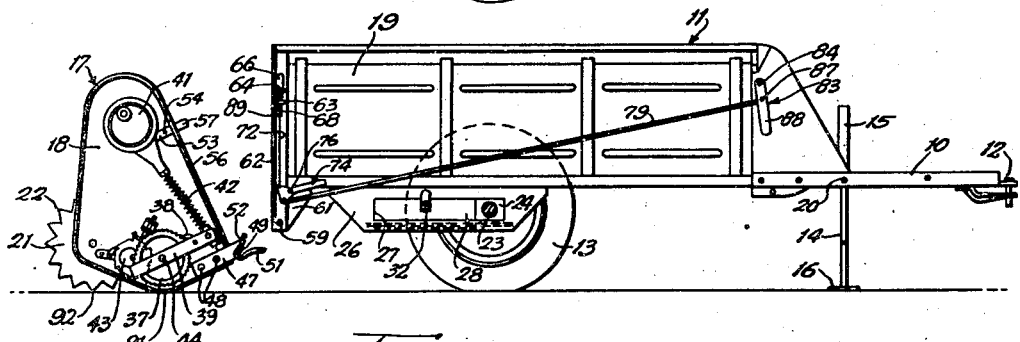
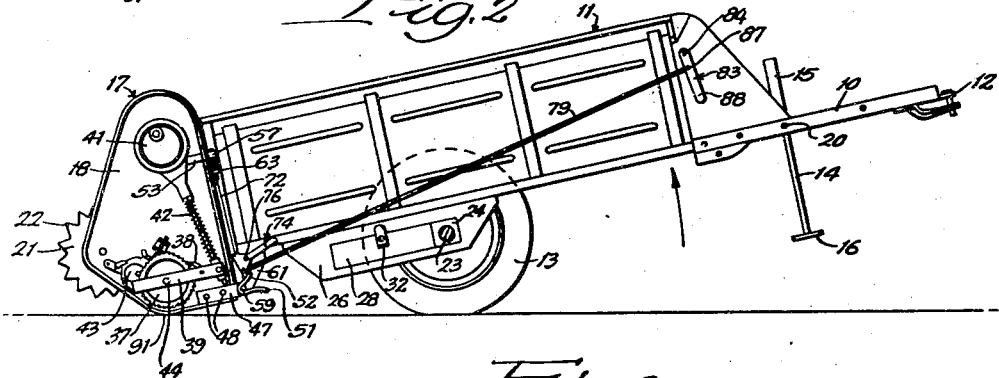
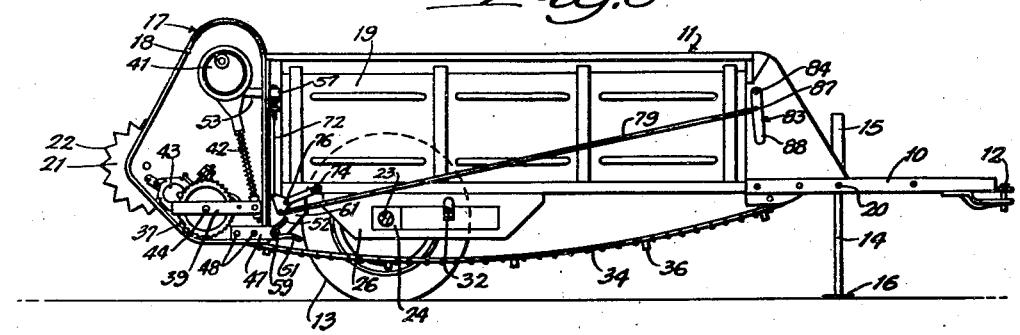

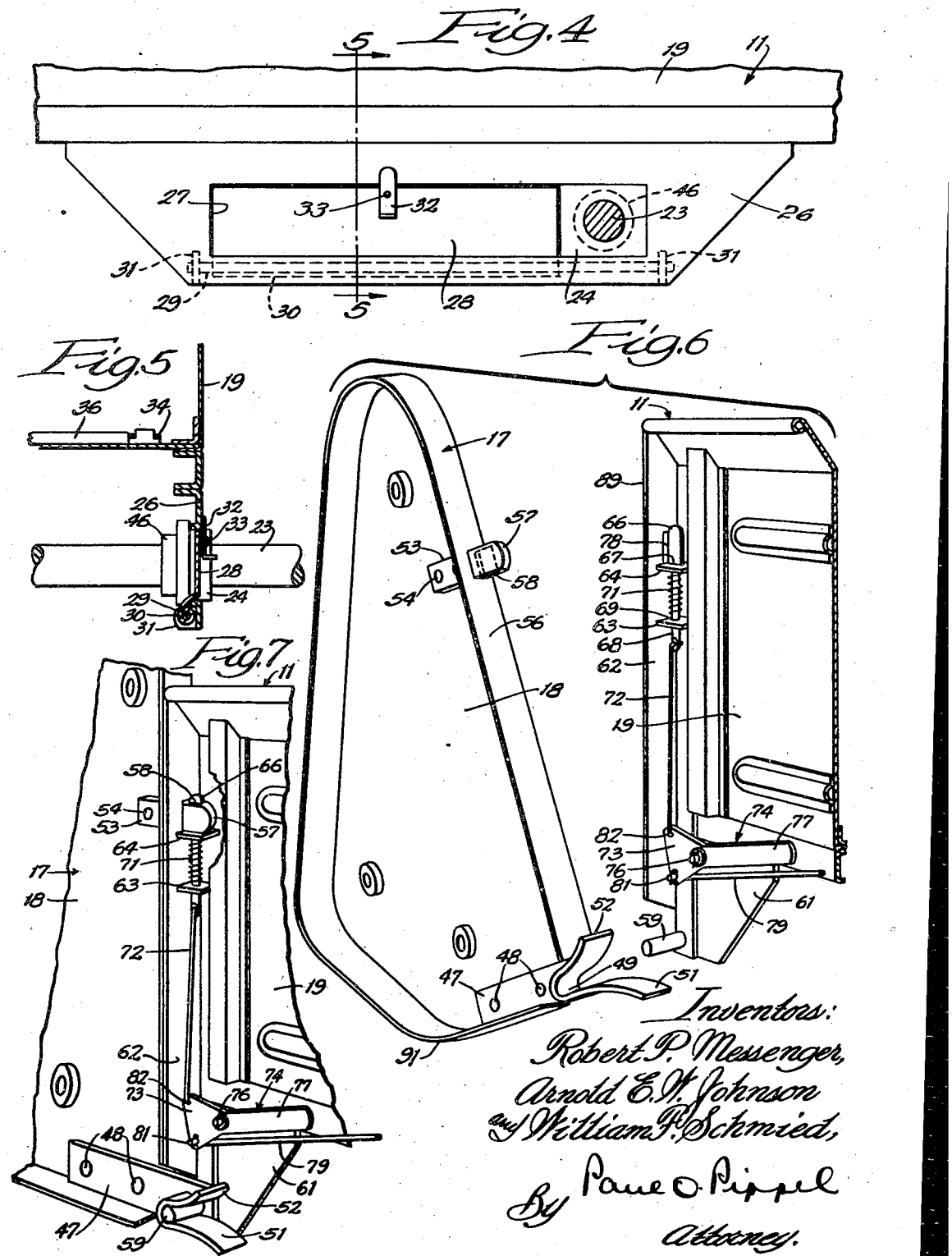

2,410,953

UNITED STATES PATENT OFFICE 2,410,953

DETACHABLE MANURE SPREADER

Robert P. Messenger, Kenilworth, Arnold E. W. Johnson, Oak Park, and William F. Schmied, Blue Island, Ill., assignors to International Harvester Company, a corporation of New Jersey Application November 22, 1943, Serial No. 511,284

7 Claims. (Cl. 275—5)

This invention relates to a new and improved detachable manure spreader and has for one of its principal objects the provision of means for quickly transforming a general purpose farm cart into a manure spreader.

An important object of this invention is to provide a farm cart and a separate complete manure spreader unit which is so designed as to permit a single operator to attach or detach the unit to the farm cart as desired.

Heretofore, manure spreaders have been designed for the sole purpose of spreading manure, and, when not in such use, the vehicle was idle. The very nature of the spreader vehicle is that of an ordinary wagon except for the fact that it is positioned relatively closer to the ground. Most farmers have and use wagons for general farm purposes, and it is desirable to adapt same for attachment of an inexpensive spreader unit. Small farm owners could not afford to tie up their limited capital in a large manure spreader which would be idle for the major portion of the time. Yet these small farmers must necessarily have wagons or carts, and it is, therefore, an important object of the present invention to provide a small farm cart capable of having a manure spreader unit detachably mounted on one end thereof and thereby transform the farm cart to a spreader.

Another important object of this invention is the provision of a longitudinal shiftable wheel truck to permit efficient transformation of a farm cart to a spreader.

A further important object of this invention is to provide an open rear end cart capable of receiving a spreader unit and thus closing the open rear end.

A still further important object is the provision of an open rear end cart and a spreader unit having alinable interengageable detachable locking means at their respective side edges.

Another and still further important object of this invention is to provide an open rear end tiltable wheeled cart adapted to detachably engage a proximately positioned spreader unit when the cart is in tilted position and pick up the spreader unit in rear end closing relation to the cart when the latter is returned to untilted position.

Other and further important objects of this invention will become apparent from the disclosures in the following specification and accompanying drawings, in which:

Figure 1 is a side elevation of the farm cart and spreader unit previous to attaching;

Figure 2 is a view similar to Figure 1 with the farm cart tilted and joining the spreader unit;

Figure 3 is a view similar to 1 and 2 showing the spreader unit fully attached and the farm cart in normal upright position;

Figure 4 is a detail showing the sliding gate means for locking the wheel truck in forward or rearward position;

Figure 5 is a sectional view taken on the line 5—5 of Figure 4;

Figure 6 is a detailed perspective view showing the farm cart about to join the spreader unit; and Figure 7 is a view similar to Figure 6 showing the cart and spreader unit completely attached.

As shown in the drawings:

The reference numeral 11 indicates generally a two-wheeled farm cart having a pole or tongue means 10 with a clevis, as shown at 12, which will readily attach to the draw-bar of a tractor or the like. The wheels are shown at 13, and it will be noted that they are normally slightly to the rear of the center of the cart as shown in Figure 1. A leg member is shown at 14 having a ground-engaging foot 16 positioned at the forward end of the cart and for use when the cart is not attached to any draft vehicle. When the clevis 12 is attached to some draft vehicle, the leg 14 is moved to an upward position within a fixed sleeve 15. This shifting of the leg 14 is accomplished by the removal of a pin 20, or the like, which may be again inserted when the leg is in its uppermost position and thereupon maintains the leg in such upward position.

A manure spreader unit is shown at 17 and has a pair of spaced apart side plates as shown at 18 for rearward continuations of the sides 19 of the cart 11. Mounted intermediate the side plates 18 are means for agitating and spreading the manure as it leaves the cart. These means are substantially standard and include rotating beaters (not shown) and a wide spreading auger as shown at 21. This auger 21 is equipped with saw-tooth points around the periphery of the auger flighting as designated by the numeral 22. The beaters and the spreading auger 21 are rotatably driven by a suitable means such as the power take-off from a tractor or by connection to the ground-engaging wheels 13.

As shown in Figure 1, the farm cart may be used as a general purpose cart in any capacity the farm owner desires. The axle 23 is journaled within rectangular bearings, as shown at 24, positioned on each side of the farm cart. Depending brackets 26 are fixedly attached beneath the cart and adjacent each side. These brackets 26 have elongated rectangular slots as shown at 27 within which the bearings 24 are adapted to slide. A gate 28, as best shown in Figures 4 and 5, is hinged on the rod 29 at 30, which is journaled in the spaced apart projections 31 of the bracket 26. The gate 28 is adapted to slide along the length of the rod 29 within the supporting projections 31. It will be noted that the rod 29 is mounted inside the bracket 26, and the gate 28, therefore, swings inwardly and downwardly on its hinge rod 29. A latch member 32, pivoted on gate 28 at 33, is adapted to be turned to a vertical position and thus maintain the gate 28 in an upward position by reason of the upper end of the latch 32 overlapping the side wall of the bracket 26. The wheel axle 23, as best shown in Figure 5, is equipped with a pair of annular shoulders 46 spaced apart so that, as shown in this Figure 5, each rectangular bearing member 24 may abut a shoulder 46 and hence cause the bearings to remain within the rectangular slots 27 in the brackets 26.

As previously stated, the farm cart, as shown in Figure 1, is for general purpose duty and, therefore, it is desired to have the wheels 13 at a position substantially centrally of the cart to better assume the cart load. A regular manure spreader has its wheels at the rear of the cart to compensate for the added weight of the spreader unit. If the wheels were positioned at the rear for general purpose cart use, the draft vehicle would be carrying the load rather than the cart. In the present device the wheels 13 may be locked in either a forward or rearward position. To accomplish a shifting of the wheel truck in either direction, the gates 28 are unlatched and turned downwardly about the hinge rods 29, whereupon the rectangular bearings 24 are free to slide the length of the slots 27. When these bearings are in either end of the slots, the gates may be swung into position in the slots and thus complement the bearings so that the slots 27 are completely filled. This condition prevents further movement until the gates 28 are again turned downwardly.

It is customary for manure spreaders to employ longitudinally running chains having cross slats at intervals therearound and extending the length of the farm cart and running in the bottom thereof. This chain 34 with the cross slats 36 is shown in Figures 3 and 5 and is driven by rotation of the ratchet wheel 37 which is engageable by a pawl 38 pivoted on an arm 39, capable of being raised or lowered by the crank drive 41 and the connecting arm 42. An additional cam means 43 is adapted to tilt the arm 39 and thereupon cause a greater or lesser number of ratchet teeth to be engaged by the pawl 38. This variable ratchet feed device is explained in greater detail in a copending application having Serial No. 515,338, filed December 23, 1943.

The spreader unit 17 has a pair of forwardly extending brackets 47, bolted, or otherwise attached to the side plates 18 at 48, and having at their forward ends outwardly flared open-end sockets 49. These open-end sockets 49 are best shown in Figures 6 and 7 and have a downwardly curved lower lip 51 and an upwardly curved upper lip 52. A second pair of forwardly projecting brackets 53 are provided above the brackets 47 and are fastened similar to the brackets 47 by means of bolts or the like 54. The side plates 18 of the spreader unit have an outwardly turned flange 56 which extends around the periphery thereof, and through which the brackets 53 and the open-end sockets 49 project. The forward projecting portions 57 of the brackets 53 are equipped with vertical slots or passages 58.

The farm cart 11, having an open rear end and sides 19, has a stud 59 projecting outwardly from both sides thereof at diametrically opposite positions at the lower rear end of the farm cart. The studs 59 are welded, or otherwise fastened, to an extension 61 of the sides 19. The rear end of the sides 19 has outwardly turned flanges 62 and as shown in Figures 6 and 7 are equipped with a pair of vertically spaced guide plates 63 and 64. Pins 66 are adapted to slide through apertures 67 in the upper bracket 64. The pins 66 have coextensive downwardly projecting rod portions 68. The rods 68 pass through apertures 69 within the lower plate 63. Intermediate the plates 63 and 64, and surrounding the rods 68, are springs 71 adapted to normally force the pins 66 upwardly through the upper plate 64. The pins 66 are substantially rectangular in shape, and the springs 71 around the coextensive rods 68 engage the outer ends of the rectangular pins and thereupon propel the pins upwardly. The lower end of the spring 71 is restrained from a downward movement by reason of the plate 63. A connecting rod 72 is attached to the lower end of the rod 68 and has its other end fastened to one end 73 of a lever 74 at 82. The lever 74 is pivoted at 76 on the extension bracket 61, and upon an upward movement of the handle portion 77, the connecting rod 72 pulls the pins 66 downwardly.

Slots 78 are positioned adjacent the pins 66 in the side end flanges 62, and thereupon a downward movement of the pins 66 frees the passages in axial alinement with the slots 78. The lever 74 is positioned close to the rear of the farm cart 11, and inasmuch as it is very desirable to be able to depress the pins 66 from a position adjacent the forward end of the cart, a cable or rod extension 79 is attached to the end 73 of the lever 74 at 81, which is below the attaching point 82 for the connecting arm 72. The end 73 of the lever 74 is substantially triangular in shape so that the attaching point 82 is above the pivot point 76 and the attaching point 81 with the rod 79 is below the pivot point 76. It will be evident, therefore, that a pulling movement on the rod 79 will effect a depressing of the pins 66 similar to an upward movement of the handle 77. A hand lever 83 is, therefore, provided near the forward end of the farm cart and is pivoted at 84 on the side walls 19. The rod 79 attaches to the hand lever 83 at 87. A forward movement of a downward extension 88 of the lever 83 will cause a forward pulling of the rod 79 and thus depress the pins 66. The farm cart has been described as having an open end, but of course when it is not to be used as a manure spreader, a rear closing gate may be provided. Such a gate could be equipped with interlocking elements similar to those employed on the spreader unit.

As shown in Figure 1, the spreading attachment rests firmly on the ground so that the slotted extensions 57 and open-end slots 49 lie approximately at an angle of 60° to the ground. This angle may be any acute angle necessary to complement the angle of the rear edge 89 of the farm cart 11 when the farm cart is tilted upwardly as best shown in Figure 2. When the wheel truck is in its forward position, the farm cart easily tilts about the wheels so that its rear end inclines downwardly, and upon moving the lever 83 forwardly by its handle 88, the studs 59 are able to lodge within the open ends of the sockets 49 and the projections 57 may advance through the slots 78, whereupon a releasing of the handle 88 permits the spring 71 to actuate and propel the pins 66 upwardly through the now alined slots 58 in the projections 57. This operation is best shown in Figures 6 and 7, and after the pins have penetrated the slots 58, the spreading unit 17 is firmly attached to the farm cart. The next operation is to drape the slotted chain 34 around the bottom of the farm cart and engage sprockets (not shown) on the shaft 44 in the spreader unit. The additional weight added to the end of the farm cart by the spreader unit 17 is such, with the wheels 13 in a forward position as shown in Figure 1, that the spreader is materially unbalanced and the load on the draft vehicle would be excessive. Hence, the gates 28 are unlatched by turning the latch members 32 and dropped about the hinge rods 29, and the wheel truck, with its axle 23 and bearings 24, is shifted rearwardly within the rectangular slots 27 to the rear end thereof, as best shown in Figure 3. The hinged gates 28 are again brought upwardly and latched against the bracket 26, and the bearings 24 are maintained in the rear end of the slots 27. Such positioning of the axle and wheels gives added support to the point where the load is the greatest and thus diminishes the load on the draft vehicle.

The spreader unit can be as readily detached as it was attached and in a manner just opposite to that of the attaching operation. In other words, the farm cart is tilted upwardly about its wheels 13 to the point where the spreader unit rests on the ground at the two points as shown, namely, under the ratchet 37 at 91 and at the spreading auger at 92. The handle 88 is pulled forwardly and pins 66 are removed from the slots 58, and immediately upon letting the farm cart down, the spreading unit is detached from the farm cart.

It is obvious that numerous details of the quick-attachable spring latch, as well as the details for the shiftable wheel truck may be changed materially without departing from the form of the invention disclosed herein, and it is, therefore, the intention that the patent be limited only within the scope of the appended claims.

What is claimed is:

1. In combination, a tiltable cart having a longitudinally shiftable wheel truck lockable in forward or rearward positions in relation to the cart, a spreader unit, and means for attaching the spreader unit to the rear of the cart by tilting said cart when the wheel truck is locked in its forward position and engaging the rear of the cart with the spreader unit, and means for locking said wheel truck in a rearward position when the spreader unit is attached.

2. In combination, a tiltable cart, a spreader unit, means for attaching the spreader unit to the rear of the cart by tilting said cart and thereby engaging it with the unit, said means for attaching comprising projecting studs on said cart and cooperative sockets on said spreader unit, pins on said cart and cooperative slotted brackets on said spreader unit, and said pins and brackets disposed above said studs and sockets.

3. In combination, a tiltable cart, a spreader unit, means for attaching the spreader unit to the rear of the cart by tilting said cart and thereby engaging it with said unit, said means for attaching comprising projecting studs on said cart and cooperative sockets on said spreader unit, spring retained pins on said cart and cooperative slotted brackets on said spreader unit, said pins and brackets disposed above said studs and sockets.

4. In combination, a tiltable cart, a spreader unit, means for attaching the spreader unit to the rear of the cart by tilting said cart and thereby engaging it with said unit, said means for attaching comprising projecting studs on said cart and cooperative sockets on said spreader unit, spring retained pins on said cart and cooperative slotted brackets on said spreader unit, said pins and brackets disposed above said studs and sockets, and means for retracting said pins whereby the slotted brackets may be inserted into the positions previously occupied by said pins.

5. In combination, a tiltable cart, a spreader unit, means for attaching the spreader unit to the rear of the cart by tilting said cart and thereby engaging it with said unit, said means for attaching comprising projecting studs on said cart and cooperative sockets on said spreader unit, spring retained pins on said cart and cooperative slotted brackets on said spreader unit, said pins and brackets disposed above said studs and sockets, and means for retracting said pins whereby the slotted brackets may be inserted into the normal pin position with the slots in alinement with the pins, said means for retracting the pins comprising a lever pivotable on said cart beneath said pins, connecting links extending between the pins and one end of said lever, whereby movement of the other end of said lever will effect pin movement.

6. In combination, a tiltable cart, a spreader unit, means for attaching the spreader unit to the rear of the cart by tilting said cart and thereby engaging it with the unit, said means for attaching comprising projecting studs on said cart and cooperative sockets on said spreader unit, spring retained pins on said cart and cooperative slotted brackets on said spreader unit, said pins and brackets disposed above said studs and sockets, and means for retracting said pins whereby the slotted brackets may be inserted into pin position, said means for retracting the pins comprising a lever pivotable on said cart beneath said pins, connecting links extending between the pins and one end of said lever, whereby movement of the other end of said lever will effect pin movement, an auxiliary hand operating lever positioned adjacent the forward end of the cart and adapted to move concurrently with said first lever.

7. In combination, a two-wheeled cart having a pair of oppositely projecting fixed studs at its lower rear end, retractible pin means above said projecting studs, a spreader unit having a pair of forwardly open sockets at the lower forward portion thereof, and a slotted bracket above said sockets, whereby said studs are adapted to engage said sockets and said retractible pin means is adapted to engage said slotted bracket.

ROBERT P. MESSENGER.
ARNOLD E. W. JOHNSON.
WILLIAM F. SCHMIED.